United States Patent Office 3,342,793
Patented Sept. 19, 1967

3,342,793
POLYMERIZATION OF ALPHA-OLEFINS IN THE PRESENCE OF TiCl₃.⅓AlCl₃, ALKALI METAL AND AN ALKYL PHOSPHORAMIDE OR SULFURIC AMIDE
Attilio Palvarini, Milan, and Annamaria Parentela and Sabino Caporale, Cesano Maderno, Italy, assignors to Snia Viscosa Societa Nazionale Industria Applicazioni Viscosa S.p.A., Milan, Italy
No Drawing. Filed Apr. 23, 1963, Ser. No. 274,907
Claims priority, application Italy, May 7, 1962, 668,250
11 Claims. (Cl. 260—93.7)

The present process relates to the polymerization of olefins and in particular of ethylene and of propylene.

Numerous catalysts have been proposed for the polymerization of these olefins, but the most effective catalysts known have the inconvenience of including metal-organic compounds, in particular aluminium-alkyl, which are highly unstable, and also explosive and at any rate difficult to handle and to eliminate from the polymer. On the other hand, though numerous catalyst systems that do not involve those inconveniences can produce the polymerization of olefins, nevertheless they are not industrially applicable because they do not produce sufficiently stereo-specific polymers. The stereospecificity in a high percentage of the polymer is an indispensable industrial requirement, whence those catalysts cannot be considered to be industrial, that do not permit to obtaining, for instance in the polymerization of propylene, percentages of crystallinity sufficiently elevated.

The present invention involves the use of the new-catalyst system, in which are not employed any aluminium-organic compounds, and which nevertheless permits to polymerizing not only ethylene, but also propylene with high degree of stereospecificity and with excellent industrial yields.

The process according to the invention is characterized in that the polymerization of the olefin is carried out in the presence, at the beginning, of a catalyst system comprising 3 components, namely a titanium-aluminium trichloride complex salt, a metal more electropositive than aluminium and an organic complexing agent. The titanium trichloride-aluminium trichloride complex can have substantially the formula TiCl₃.⅓AlCl₃, and in such case it is the product obtainable in the trade for instance under the designation titanium trichloride AR manufactured by Stauffer Chem. Co. and at any rate obtained by the reduction of titanium tetrachloride with metallic aluminium at high temperatures. Among others there may be preferred a catalyst component richer with aluminium trichloride than the cited complex, preferably with an aluminium to titanium molar ratio that may even attain up to 5 and theoretically might assume higher values, though those values are not desirable. Those complexes richer with aluminium trichloride can be prepared for instance by reduction of titanium tetrachloride with metallic aluminium in the presence of aluminium trichloride, at the conditions normally applied for the preparation of the complexes of the trade, be it by addition of aluminium trichloride to the complexes of the trade, or be it by addition of aluminium trichloride to the complexes of the trade with formation of a solid solution. Finally, those combinations may be prepared, secondarily and as an alternative in practice, by addition of aluminium trichloride in a divided shape to the complex TiCl₃.⅓AlCl₃ or to another complex available in the market.

In any case the molar ratios of AlCl₃ to TiCl₃ correspond to values of $n$ in the formula TiCl₃.$n$AlCl₃ of from 0.33 to 5.0.

The metal more electropositive than aluminium, that is reacted with a TiCl₃.$n$AlCl₃ complex as described above, may be selected from the following metals: alkali metals, specially sodium, potassium and their alloy liquid at room temperature, alkaline-earth metals and rare earths such as lanthanium, rhodium, hafnium, alone or alloyed with one another; preferably an alkali metal or alloys of alkali metals are used.

As an organic complexing agent, tris-N,N-dimethyl phosphoramide of formula O=P(N(CH₃)₂)₃ is advantageously used.

In general the organic complexing agents of the "Lewis base" type can be used.

The molar ratios between the metal more electropositive than aluminium and the total aluminium trichloride may be of from 1 to 10 and preferably of from 2 to 5, while the molar ratios between the complex salt $$\text{TiCl}_3.n\text{AlCl}_3$$

and the organic complexing agent may be of from 0.5 to 100 and preferably from 1 to 50.

The polymerization of the olefin is generally carried out by introducing the three components of the catalyst and the olefin to be polymerized, into a polymerization reactor. The components of the catalyst are preferably employed in the shape of a dispersion in an inert solvent, it being possible for instance to use, as solvents, linear or branched aliphatic, aromatic, cycloaliphatic hydrocarbons. The polymerization is carried out under intensive stirring and at a temperature of from 10° to 150° C. The reaction pressure is variable according to the olefin employed and is comprised between 1 atm. and 150 atm. The reaction times depend on the catalyst concentration, on the monomer and on the temperature of reaction, and vary from 30 minutes to 30 hours.

The starting components of the catalyst furnish, in the initial stage of polymerization under the above described conditions, a product that acts as a catalyst in the remaining stages of the reaction and the chemical constitution of which is non-defined.

At the end of the reaction of polymerization the catalyst is taken away from the polymer by means of one of the usual purification processes, such as for instance washing with a mixture of methanol and hydrochloric acid. In that way crystalline linear polyolefins are obtained, for instance in the case of polypropylene the content of crystalline isotactic fraction (residue from the extraction with boiling n-hexane) exceeds 80% and in the most favourable conditions even 85%.

A variant of embodiment of the process consists in feeding initially the reactor with hydrogen and with an olefin, which may be the same that is to be polymerized or even different, in heating the reactor up to temperatures of from 10° C. to 150° C. and at partial pressures of from a minimum of 1 atm. up to a maximum of 30 atm. for a period of from 1 minute to 60 minutes, in then degassing the reactor and finally introducing the olefin to be polymerized, and polymerizing in the way described above.

In that case, degassing the hydrogen and olefin from the reactor, subsequently introducing the olefin to be polymerized, the polymerization takes place from the very beginning in the presence of a product that results from the interaction of the catalyst components in the presence of hydrogen and of the olefin employed, under those conditions of treatment.

The use of hydrogen permits obtaining a greater speed of polymerization while the stereospecificity remains substantially unvaried and very high, as appears from the enclosed examples. The most favourable conditions are obtained if the partial pressures of the two gases hydrogen and olefin are equal in the initial stage. The composition of the complex salt $TiCl_3.nAlCl_3$, namely its content of aluminium trichloride influences the course of polymerization. It has been found that an increase of the $AlCl_3$ content in the complex salt, corresponding to values of $n$, in the formula $TiCl_3.nAlCl_3$ which are higher than 0.33, leads to an increase of the speed of polymerization, while the stereospecificity of the catalyst remains substantially unvaried and at any rate very high.

The above defined catalyst comprising three components namely the complex salt $TiCl_3.nAlCl_3$, the metal more electropositive than aluminium and the organic complexing agent furnishes polymers with very satisfactory values of crystallinity and yields.

It has been found among other things that the olefin in question in particular ethylene and propylene, can be polymerized attaining fairly good values of crystallinity also with a two-component catalyst, namely the same catalyst previously described but with the omission of the organic complexing agent. The use of such a catalyst system, namely the polymerization in the initial presence of two aforesaid components (titanium trichloride-aluminium trichloride complex salt and metal more electropositive than aluminium) or of their reaction products in the presence of olefines or of hydrogen and olefins, forms, therefore, part of the scope of the present application, but represents a novel aspect of the invention since it leads to crystallinity values considerably lower than those attainable with preferred ternary catalyst.

This type of catalyst with two components is employed in a manner analogous to the ternary one introducing the constituents into a reactor as indicated in the respective examples and heating under intensive stirring at a temperature of from 10° to 150° for a period of time of from 30 minutes to 30 hours and in the presence of a solvent as a dispersing means, it being possible for instance to use linear or branched aliphatic, aromatic, cycloaliphatic hydrocarbons as solvents. Also in the case of the two components catalyst, the enrichment with aluminium trichloride of the complex salt $TiCl_3.nAlCl_3$ corresponding to values of $n$ higher than 0.33, is convenient for the purpose of increasing the yield of polyolefinic polymer while the stereospecificity remains substantially unvaried.

*Example 1*

Into a steel autoclave of 1 litre capacity having a mechanical stirrer with 500 r.p.m., there are introduced orderly, in inert atmosphere: 200 ml. of anhydrous n-hexane, 2.0 g. of $TiCl_3.\frac{1}{3}AlCl_3$ "Stauffer AR" complex, 1.20 g. of sodium-potassium alloy (with 80% of potassium), 0.134 g. of tris-N,N-dimethylsulfuric amide and ethylene up to a pressure of 10 atm.

The autoclave is heated up to 80° C., at which temperature a rapid absorption of ethylene takes place. The polymerization is kept at 15 atm. pressure by means of continuous addition of ethylene, and at the temperature of 80° C. After 5 hours, the reaction is interrupted and a mass of whitish-violet polymer is discharged, which is coagulated and washed with methanol and hydrochloric acid until the polymer becomes colourless.

There are obtained 150 g. of solid polyethylene having a melting point of 128°–129° C. at the birefringent microscope.

The polymer is little soluble in tetralin, the intrinsic viscosity measured on a solution in tetralin at 120° C. is higher than 4.

*Example 2*

Into the autoclave of Example 1 are introduced in inert atmosphere: 80 ml. of anhydrous n-hexane (with 80% of potassium), 0.187 g. of tris-N,N-dimethyl-phosphoric amide; then propylene is compressed thereinto up to a pressure of 20 atm. at 80° C. temperature.

Intensive stirring is kept at 500 r.p.m. at 80° C. temperature for a duration of 7 hours, always keeping the pressure inside the autoclave at 20 atm. by means of continuous feeding of propylene.

From the autoclave is discharged a polymeric mass of violet colour in the shape of a fine powder, that is purified by treatment with methanol-hydrochloric acid.

There are obtained 143 g. of polypropylene having a content of crystalline isotactic fraction (measured as a residue from extraction with boiling n-hexane) of 82%.

The melting point of the crystalline isotactic fraction, as measured at the birefringent microscope, is 162° C. while the intrinsic viscosity, measured in Decalin, at 135° C., is 4.5.

*Example 3*

Into the autoclave of Example 1 are introduced in inert atmosphere: 80 ml. of anhydrous n-hexane, 3.1 g. of Stauffer AR complex, 1.9 g. of sodium-potassium alloy, 0.4 g. tris-N,N-dimethylphosphoric amide, then propylene is pressed thereinto up to a pressure of 20 atm. at 80° C. temperature. Operation is carried out as in Example 1 and after 7 hours' reaction are obtained 10.75 g. of polypropylene having a content of crystalline isotactic fraction of 83.5% (measured as a residue on extraction with boiling n-hexane).

The melting point at the birefringent microscope is 163° C., while the intrinsic viscosity measured in Decalin at 135° C. is 3.25.

*Example 4*

Into the autoclave of Example 1, are introduced in inert atmosphere: 80 ml. of anhydrous m-hexane, 3.1 g. of Stauffer AR complex, 1.9 g. of sodium-potassium alloy (80% of potassium), 0.20 g. of tris-N,N-dimethylphosphoric amide; then 0.50 g. of hydrogen are compressed thereinto as well as 15 g. of ethylene. The whole is heated under intensive stirring up to 100° C. for the duration of 1 hour, at which temperature a slight diminution of pressure of about 3 atm. is noticed.

At this time the autoclave is cooled down to 50° C. and the residual gaseous mixture of hydrogen and ethylene is degassed, and propylene is introduced until getting a pressure of 20 atm. at 80° C.

The polymerization is carried on at 80° C. for 8 hours, whereafter there is discharged from the autoclave a polymeric mass of violet colour in the shape of fine powder, that is purified by the usual method. There are obtained 153 g. of polypropylene having 88% of crystalline isotactic fraction (fraction insoluble in boiling n-hexane). The melting point is 163° C. (at the birefringent microscope), and the intrinsic viscosity is 4.20, measured in Decalin at 135° C.

*Example 5*

Into the autoclave of Example 1 are introduced in inert atmosphere: 80 cc. of anhydrous n-hexane, 3.1 g. of Stauffer AR complex, 1.9 g. of sodium-potassium alloy (80% of potassium), 0.40 g. of tris-N,N-dimethylphosphoramide. Then are compressed 0.50 g. of hydrogen and 15 g. of ethylene. The operation is carried out as has been indicated in Example 4 and after 9 hours' polymerization at 80° C., 154 g. of polypropylene are obtained, with a content of crystalline isotactic fraction (fraction insoluble in boiling n-hexane) of 85%. The melting point at the birefringent microscope is 161° C. and the intrinsic viscosity is 3, measured in Decalin at 135° C.

Example 6

Into the autoclave of Example 1 are introduced in inert atmosphere: 80 cc. of anhydrous n-hexane, 3.1 g. of Stauffer AR complex, 2.0 g. of potassium, 0.2 g. of tris-N,N-dimethylphosphorimide. Then are compressed: 0.5 g. of hydrogen and 15 g. of ethylene. The operation is carried out as has been indicated in Example 4 and after 8 hours of polymerization at 80° C. there are obtained 163 g. of polypropylene, with a content of isotactic crystalline fraction (fraction insoluble in boiling n-hexane) of 88%. The melting point at the birefringent microscope is 161° C.

Example 7

Into the autoclave of Example 1, there are introduced in inert atmosphere: 80 ml. of anhydrous n-hexane, 3.1 g. of Stauffer AR complex, 2.0 g. of sodium and 0.2 g. of tris-N, N-dimethylphosphoramide. Then 0.5 g. of hydrogen and 15 g. of ethylene are compressed. The operation is carried out as has been indicated in Example 4 and after 8 hours' polymerization at 100° C. are obtained 220 g. of polypropylene with a content of crystalline isotactic fraction (fraction insoluble in boiling n-hexane) of 85.4%. The melting point at the birefringent microscope is 162° C.

Example 8

Into the autoclave of Example 1, are introduced in inert atmosphere: 80 ml. of n-hexane, 1.4 g. of anhydrous aluminium trichloride previously treated with 2.8 g. of Stauffer AR complex for 4 hours in a ball mill, 1.9 g. of sodium-potassium alloy (with 80% of potassium), 0.20 g. of tris-N,N-dimethylphosphoramide. Heating is started while intensively stirring and propylene is charged up to a pressure of 20 atm. at the temperature of 80° C. That pressure is kept constant in the course of polymerization by means of continuous addition of propylene. After 8 hours' reaction at 80° C., a polymeric mass is discharged having violet colour, which is purified by means of treatment with methanol-hydrochloric acid. There are obtained 165 g. of polypropylene having a content of crystalline isotactic fraction insoluble in boiling n-hexane at 83%. The melting point at the birefringent microscope is 162° C. and the intrinsic viscosity in Decalin at 135° C. is 3.2.

Example 9

Into the autoclave of Example 1 are introduced in inert atmosphere: 80 ml. of anhydrous n-hexane, 1.4 g. of aluminium trichloride and 2.8 g. of Stauffer AR complex previously ground in a ball mill for 4 hours, 1.9 g. of sodium-potassium alloy (with 80% of potassium), 0.50 g. of tris-N,N-dimethylphosphoramide. Heating is started while intensively stirring and 0.5 g. of hydrogen and 15 g. of ethylene are compressed. Stirring is kept up at 80° C. for 90 minutes obtaining at this stage a diminution of pressure about 2 atm. Then the autoclave is cooled down to 50° C., the mixture of hydrogen and ethylene is vented and propylene is introduced up to a pressure of 20 atm. at 80° C. The polymerization is carried out at 80° C. and at 20 atm. After 7 hours a violet polymer is discharged that is purified as indicated in Example 8. In that way, 137 g. of polypropylene are obtained, having a content of crystalline isotactic fraction insoluble in boiling n-hexane, of 88.5%. The melting point at the microscope is 163° C. and the intrinsic viscosity in Decalin at 135° C. is 3.6.

Example 10

Into the autoclave of Example 1 are introduced in inert atmosphere: 80 ml. of anhydrous n-hexane, 1.4 of aluminium trichloride and 2.8 g. of Stauffer AR complex previously ground in a ball mill for 4 hours, 1.9 g. of sodium-potassium alloy (with 80% of potassium), 0.10 g. of tris-N,N-dimethylphosphoramide. Heating is started under intensive stirring and 0.5 g. of hydrogen and 15 g. of ethylene are compressed. Stirring is kept up at 80° C. for 90 minutes, obtaining at this stage a diminution of pressure of about 2 atm. Then the autoclave is cooled down to 50° C., the residual mixture of hydrogen and ethylene is degassed and propylene is introduced at a pressure of 20 atm. at 80° C. The polymerization is carried out at 80° C. and at 20 atm. After 7 hours, a violet polymer is discharged that is purified as in Example 8. There are obtained 363 g. of polypropylene having a content of crystalline isotactic fraction in boiling n-hexane, of 87.3%. The melting point determined at the birefringent microscope is 160° C.

Example 11

Into the autoclave of Example 1 are introduced in inert atmosphere: 80 ml. of anhydrous n-hexane, 1.4 g. of aluminium trichloride and 2.8 g. of Stauffer AR complex previously ground in a ball mill for 4 hours, 1.9 g. of sodium-potassium alloy (with 80% of potassium), 0.10 g. of tris-N,N-dimethylphosphoramide. Heating is commenced under intensive stirring and 0.5 g. of hydrogen and 15 g. of propylene are introduced. The stirring is kept up at 90° C. for 90 minutes, where a lowering of pressure by about 2 atm. is noticed. At this time the autoclave is cooled down without interrupting the stirring, the hydrogen-propylene mixture is degassed and propylene is introduced up to a pressure of 20 atm. at 90° C. The polymerization is conducted at 90° C. and at 20 atm. with continuous addition of propylene. After 8 hours' reaction a polymer having violet colour is discharged, that is purified as indicated in Example 1. 235 g. of polypropylene are discharged having a content of crystalline isotactic fraction insoluble in boiling n-hexane of 84%. The melting point at the birefringent microscope is 161° C.

Example 12

Into the autoclave of Example 1 are introduced in inert atmosphere: 200 ml. of anhydrous n-hexane, 2.0 g. of Stauffer AR complex, 0.80 g. of sodium-potassium alloy (1:1 by weight), 0.5 g. of hydrogen and 15 g. of propylene. The whole is rapidly heated up to 80° C., then temperature is raised up to 110° C. in about 3 hours' time. At this stage only a slight diminution of pressure is noticed. At this time the autoclave is cooled without interrupting the stirring, the mixture of hydrogen-propylene is degassed, and 135 g. of ethylene are introduced. The temperature is brought to 100° C., attaining a pressure (internal pressure) of 44 atm. The absorption of ethylene is rapid and is completed in about 6 hours. From the autoclave, a mass of whitish violet polymer is discharged, that is coagulated and washed with methanol until a colourless polymer is obtained. There are obtained 130 g. of solid polyethylene, with a conversion of 96% of the ethylene employed, and having a melting point of 128 to 129° C. at the birefringent microscope. The polymer is hardly soluble in tetralin; that indicates that it is a polyethylene with high molecular value. The intrinsic viscosity, measured on a solution in tetralin at 120° C., is higher than 4.

Example 13

Into the autoclave of Example 1 are introduced 200 ml. of anhydrous n-hexane, 3.3 g. of Stauffer AR complex, 1.3 g. of sodium-potassium alloy, 0.5 g. of hydrogen and 15 g. of propylene. The autoclave is rapidly heated up to 80° C. and then the temperature is raised up to 105° C. in 3 hours, when a slight diminution of pressure is noticed, then the autoclave is cooled down, the hydrogen-propylene mixture is degassed and 110 g. of propylene are introduced. The whole is heated up to 80° C., when a rapid absorption of monomer takes place, which is completed in about 3 hours. The polymer is formed in fine subdivision and is purified with methanol and HCl. There are obtained 102 g. of solid polypropylene, with a conversion of 93% of the monomer employed and having a crystallinity of 55% (residue from boiling n-hexane). The melting point at the microscope by birefringency is 160° C. The intrinsic viscosity is 2.67 measured in Decalin at 135° C.

*Example 14*

Into an autoclave like that of Example 1 are introduced in inert atmosphere while stirring: 200 ml. of anhydrous n-hexane, 1.4 g. of anhydrous powdery aluminium trichloride previously treated with 2.8 g. of Stauffer AR complex in a ball mill for 4 hours, 1.9 g. of sodium-potassium alloy (1:1 by weight, 0.4 g., of hydrogen and 15 g. of propylene.) The whole is heated to 80° C. and is kept under stirring for 90 minutes, in that stage is noticed a lowering of pressure by about 2 atm. At this time the autoclave is cooled down without interrupting the stirring, the hydrogen-propylene mixture is degassed and 100 g. of propylene are introduced. The temperature is brought to 80° C. and pressure is kept at about 15 atm. by periodical addition of propylene. After 7 hours' reaction, 328 g. of solid polymer are obtained, of which 60% is insoluble in boiling n-hexane. The crystalline fraction has a melting point, at the birefringent microscope, of 165° C. and an intrinsic viscosity of 2.8, measured in Decalin at 135° C.

*Example 15*

Into the autoclave of Example 1 are introduced in inert atmosphere: 200 ml. of anyhdrous n-hexane, 1.3 g. of anhydrous powdery aluminium trichloride, previously treated with 2.6 g. of Stauffer AR complex in a ball mill for 4 hours, 1.9 g. of sodium-potassium alloy, 0.4 g. of hydrogen and 15 g. of butene-1. The whole is heated to 80° C. while stirring for 90 minutes; at that stage a lowering of pressure by about 2 atm. is noticed. At this time the hydrogen-butene mixture is degassed and 100 g. of propylene are charged. The polymerization is carried out at 80° C. for 7 hours keeping a pressure of 15 atm. by continuous introduction of propylene. 374 g. of solid polymer are again charged, the crystalline fraction insoluble in boiling n-hexane whereof amounts to 61.5%. The melting point of the crystalline fraction is 168° C. measured at the birefringent microscope; the intrinsic viscosity is 2.8 (measured in Decalin at 135° C.).

*Example 16*

Into the autoclave of Examples 1 and 2 are introduced: 200 ml. of anhydrous n-hexane, 1.3 g. of aluminium trichloride, powdery, and 2.6 g. of Stauffer AR complex previously ground in a ball mill for 4 hours, 1.9 g. of sodium-potassium alloy, 0.4 g. of hydrogen and 10 g. of ethylene. The whole is heated up to 80° C. for 90 minutes; at this stage a diminution of pressure by about 2 atm. is obtained. Then the autoclave is cooled down, the hydrogen-ethylene mixture is degassed and propylene is charged. The polymerization is carried out at 80° C. and at 15 atm., by means of continuous introduction of propylene. After 7 hours' reaction there are obtained 300 g. of solid polypropylene, having a crystalline content of 65% (fraction insoluble in boiling n-hexane). The melting point of the crystalline fraction is 168.5° C. (at the birefringent microscope) whilst the intrinsic viscosity is 2.5, measured in Decalin at 135° C.

We claim:

1. A process for homopolymerization of olefins selected from the group consisting of ethylene and propylene, for providing a highly crystalline polymer, comprising effecting the homopolymerization by a complexed catalyst system consisting of a complex salt titanium trichloride-aluminum trichloride of the formula $$TiCl_3 \cdot \tfrac{1}{3} AlCl_3$$

a metal selected from the group consisting of sodium, potassium, and sodium-potassium alloys, and an organic compound selected from the group consisting of tris-N, N-dimethylphosphoramide and tris-N, N-dimethyl sulfuric amide.

2. A process for homopolymerization of olefins selected from the group consisting of ethylene and propylene, for providing a highly crystalline polymer, comprising effecting the homopolymerization by a complexed catalyst system consisting of a complex salt titanium trichloride-aluminum trichloride, a metal selected from the group consisting of sodium, potassium, and sodium-potassium alloys and an organic compound selected from the group consisting of tris-N, N-dimethylphosphoramide and tris-N, N-dimethyl sulfuric amide.

3. A process for homopolymerization of olefins selected from the group consisting of ethylene and propylene, for providing a highly crystalline polymer, comprising effecting the polymerization by a complexed catalyst system comprising:
  (a) a complex salt titanium trichloride-aluminum trichloride provided by adding to a given amount in weight of complex salt of the formula $TiCl_3 \cdot \tfrac{1}{3} AlCl_3$ an amount in weight of $AlCl_3$ corresponding to one half of said given amount,
  (b) a metal selected from the group consisting of sodium, potassium and sodium-potassium alloys, and
  (c) a tris-N,N-dimethylphosphoramide, the said catalyst system being provided by causing the above components to react in an atmosphere of hydrogen and of the olefin to be homopolymerized to provide the said complexed system, and then degassing the said gaseous components of said atmosphere.

4. The process of claim 3 wherein the molar ratio of the total $AlCl_3$ present in the catalyst to said metal is between 1/2 and 1/5.

5. The process of claim 3, wherein the molar ratio of said complex salt to said organic compound is between 1/1 and 50/1.

6. A process for homopolymerization of olefins selected from the group consisting of ethylene and propylene, for providing a highly crystalline polymer, comprising effecting the polymerization by a complexed catalyst system consisting of:
  (a) a complex salt titanium trichloride provided by adding to a given amount of complex salt of the formula $TiCl_3 \cdot \tfrac{1}{3} AlCl_3$ an amount of $AlCl_3$ to obtain a complex having the formula $TiCl_3 \cdot n AlCl_3$ wherein $n$ is between more than 0.33 and 5,
  (b) a metal selected from the group consisting of sodium, potassium and sodium-potassium alloys, and
  (c) a tris-N,N-dimethylphosphoramide.

7. The process of claim 6, wherein the molar ratio of the total $AlCl_3$ present in the catalyst to said metal is between 1/2 and 1/5.

8. The process of claim 6, wherein molar ratio of said complex salt to said organic compound is between 1/1 and 50/1.

9. A process for homopolymerization of olefins selected from the group consisting of ethylene and propylene, for providing a highly crystalline polymer, comprising effecting the polymerization by a complexed catalyst system consisting of:
  (a) a complex salt titanium trichloride-aluminium trichloride having the formula $TiCl_3 \cdot \tfrac{1}{3} AlCl_3$,
  (b) a metal selected from the group consisting of sodium, potassium, and sodium-potassium alloys, and
  (c) an organic compound selected from the group consisting of tris-N,N-dimethylphosphoramide and tris-N,N-dimethyl sulfuric amide, the said catalytic system being provided by causing the above components to react in an atmosphere of hydrogen and of an olefin of said group to provide the said complexed system, and then degassing the said gaseous components of said atmosphere.

10. The process of claim 9 wherein the molar ratio of the total $AlCl_3$ present in the catalyst to said metal is between 1/2 and 1/5.

11. The process of claim 9, wherein molar ratio of said complex salt to said organic compound is between 1/1 and 50/1.

References Cited

UNITED STATES PATENTS

| | | | |
|---|---|---|---|
| 2,905,645 | 9/1959 | Anderson | 260—94.9 |
| 2,962,487 | 11/1960 | Coover | 260—94.9 |
| 3,032,510 | 5/1962 | Tornqvist | 260—94.9 |
| 3,061,410 | 10/1962 | Toland | 260—94.9 |
| 3,093,625 | 6/1963 | Friederich | 260—88.2 |
| 3,239,497 | 3/1966 | Machida | 260—93.7 |
| 3,196,137 | 7/1967 | Cain | 260—93.7 |

FOREIGN PATENTS

| | | |
|---|---|---|
| 1,231,089 | 6/1960 | France. |
| 785,314 | 10/1957 | Great Britain. |
| 824,451 | 12/1959 | Great Britain. |

JOSEPH L. SCHOFER, *Primary Examiner.*

M. B. KURTZMAN, *Assistant Examiner.*